United States Patent [19]

Mosher

[11] Patent Number: 4,678,046

[45] Date of Patent: Jul. 7, 1987

[54] COMBINATION WEIGHING APPARATUS FOR TWO COMBINED PRODUCTS

[75] Inventor: Oren A. Mosher, Hayward, Calif.

[73] Assignee: Package Machinery Company, East Longmeadow, Mass.

[21] Appl. No.: 824,842

[22] Filed: Jan. 31, 1986

[51] Int. Cl.⁴ .............................................. G01G 19/22
[52] U.S. Cl. ........................................... 177/1; 177/25; 177/70
[58] Field of Search ................................ 177/1, 25, 70

[56] References Cited

U.S. PATENT DOCUMENTS

| | | | |
|---|---|---|---|
| 4,473,126 | 9/1984 | Hirano | 177/70 X |
| 4,522,274 | 6/1985 | Konishi et al. | 177/70 X |
| 4,549,617 | 10/1985 | Matsumoto et al. | 177/70 X |
| 4,558,774 | 12/1985 | Mikami | 177/25 X |
| 4,602,709 | 7/1986 | Ueda | 177/25 X |

Primary Examiner—George H. Miller, Jr.
Attorney, Agent, or Firm—McCormick, Paulding and Huber

[57] ABSTRACT

A combination weighing system is disclosed which system is adapted to weigh out quantities of two or more different types of products and mix them together. The system includes a plurality of weighing scales divided into two groups, one group weighing out quantities of a first type of product and the other group weighing out quantities of a second type of product. A computer is provided to search the first group of scales and select a combination which contains a combined quantity of the first type of product near in weight to a predetermined fractional target weight and for searching the second group of scales and select a combination which contains a quantity of the second type of product near in weight to the difference between a target weight for both products and the weight of the product within the combination of scales selected from the first group. The selected scales of both groups empty into a common discharge chute after weighing and searching is completed. The scales of both groups are dumped at times such that both products arrive in the common discharge chute at the same time and mingle and mix with each other. Related methods are also disclosed.

32 Claims, 6 Drawing Figures

COMBINATION WEIGHING APPARATUS FOR TWO COMBINED PRODUCTS

BACKGROUND OF THE INVENTION

The invention relates generally to combination weighing systems and deals more particularly with a combination weighing system which weighs out quantities of two or more different products for inclusion in a single package.

In packages containing different types of products, usually the precise amount of each product in the package is not critical; however, it is desirable that each amount approximate a predetermined, fractional weight and it is generally necessary that the total weight of all products be not less than a predetermined target weight. Also, it is frequently desirable that the different components exist in mixed form within the package.

It is known in the industry to weigh out two or more separate quantities of different products, each weighing process being carried out with a single scale, and then deliver the quantities of products to a mechanical mixer having mixing blades. After mixing, the batch is dispensed into a package. A problem with this system is that the blades may damage the product during mixing. Another problem stems from the fact that each scale operates independently of the other and therefore, is required to weigh out a quantity of product at or above a fractional target weight with a resultant giveaway, the difference between the actual weight of the quantity and the fractional target weight. Consequently, on the average, the total weight exceeds the package target weight by an amount equal to twice the average giveaway associated with scales of the kind. Still another problem with this system is that the mixer adds to the size, and particularly the height of the weighing and mixing system.

Combination weighing machines which weigh out a quantity of a single type of product are known in the industry and in general, operate at high speed and provide little giveaway. Such machines employ a multiplicity of weighing scales, a computer which searches the scales to select a combination of them having a combined weight near a target weight, usually at or above the target weight, and a common discharge chute which receives product dumped from the selected scales and guides it to a packaging device. There are many known processes for searching a number of scales to locate a combination which satisfies weight range criteria. In one process, a combination weighing system includes several scales and a binary counter which generates $2^N-1$ counts from "N" output ports. Each output port of the counter represents one of the scales so that each count indicates a different combination of scales. Another combination searching process is disclosed in U.S. Pat. No. 4,466,500 to Mosher, et al. in which a combination generator searches sequences of combinations of scales, with certain steps of these sequences being omitted from the sequence if they involve subcombinations previously searched and found to be at or above the target weight. The Mosher '500 patent is assigned to the assignee of the present invention and is adopted by reference as part of the present disclosure.

Occasionally, combination weighing systems "lockup", a condition in which no combination of scales satisfies the package weight criteria. To overcome lockup, product may be added to or removed from one or more scales and another search performed. Often the addition or removal of product is performed manually.

A general aim of the invention is to provide a weighing system which weighs out quantities of two or more different types of products in correct proportions and amounts totaling the target weight for a single package.

A more specific aim of the invention is to provide a weighing system of the foregoing type which minimizes the giveaway.

Another specific aim of the invention is to provide a weighing system of the foregoing type which also mixes together the two or more different types of products prior to packaging.

Another specific aim of the invention is to provide a system of the foregoing type in which the mixing operation does not harm the product.

Still another specific aim of the invention is to provide a system of the foregoing type in which the means for mixing is inexpensive to implement.

Still another specific aim of the invention is to provide a combination weighing system of the foregoing type in which the incidence of lock-up is small.

SUMMARY OF INVENTION

The invention resides in a combination weighing system for weighing out quantities of at least two different types of products to contribute to a single package. The system comprises a plurality of weighing scales divided into a first group which weighs out quantities of a first type of product and a second group which weighs out quantities of a second type of product. The system also includes a computer or other means for searching the first group of scales to select a combination which contains a combined quantity of the first type of product near in weight to a predetermined fractional target weight for the first type of product in the package, and for searching the second group of weighing scales to select a combination which contains a combined quantity of the second product near in weight to the difference between the target weight for both products in the package and the weight of product in the combination of the first type of product in the select combination.

According to another feature of the invention, the combination weighing system provides means for mixing the two different types of products together. The mixing is accomplished by dumping the selected scales of the first group and the selected scales of the second group into a common discharge chute at times which causes the two types of products to mingle and thereby mix within the chute as the products travel through it.

The invention also resides in related methods for searching for appropriate combinations of the two types of products and for mixing the two types of products.

DETAILED DESCRIPTION OF THE PREFERRED EMBODIMENTS

Figure 1:
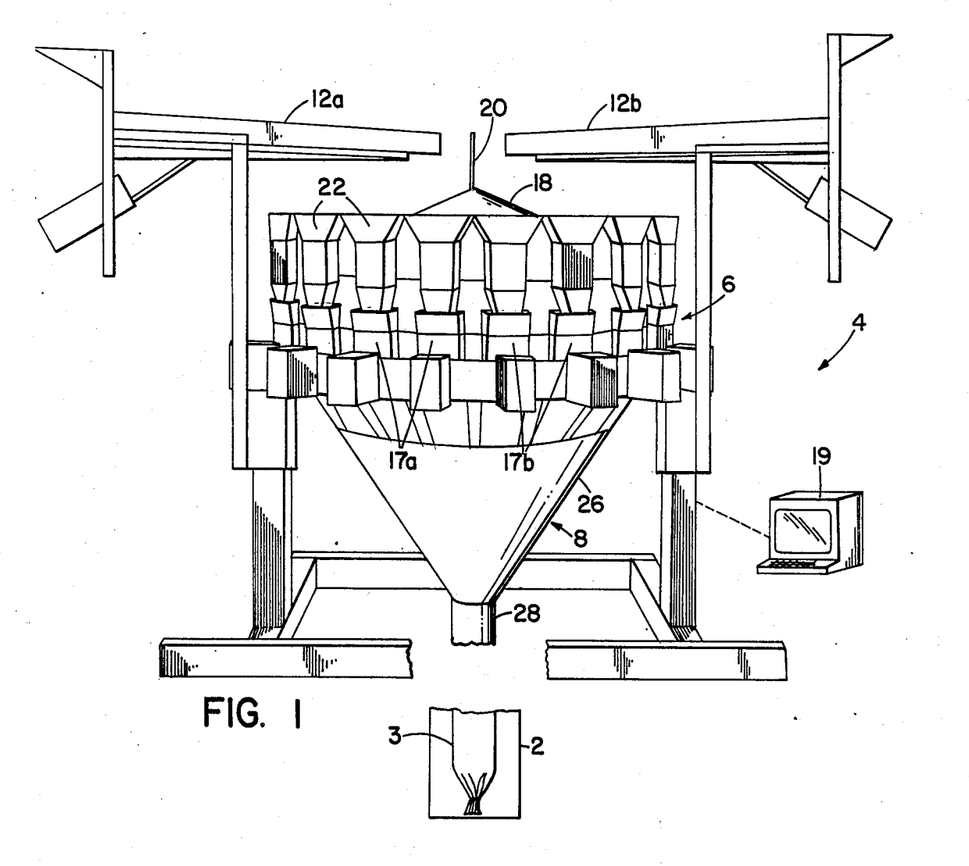
FIG. 1 is a frontal perspective view of a combination weighing system in which the invention is embodied.

Turning now to the Figures, FIG. 1 illustrates a combination weighing system generally designated 4, in which the invention is embodied. The system 4 includes a combination weighing machine 6 and loading conveyors 12a and 12b which feed products A and B, respectively to the weighing machine 6. The weighing machine 6 includes a first group of scales 17a,17a and a second group of scales 17b,17b on the other side. A product feed assembly 16 receives products from the conveyors 12a and 12b and delivers them separately to the groups of weighing scales 17a,17a and 17b,17b, respectively. A control computer 19 monitors the weight signals produced by the scales and searches for combinations of the scales which satisfy weight range criteria of a package as explained in further detail below. The weighing machine 6 also includes a common discharge chute 8 which receives product dumped from selected scales 17a,17a, and 17b,17b of each group to fill a package 3 usually through a bagging or other packaging machine.

Figure 2:
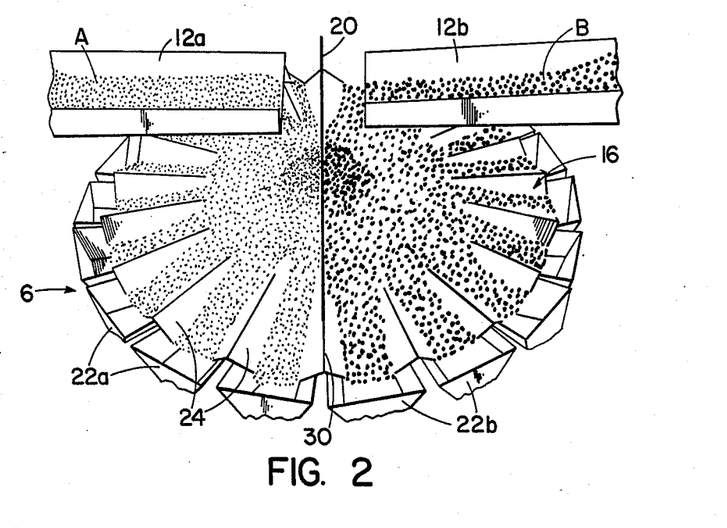
FIG. 2 is another perspective view from the upper frontal portion of the combination weighing system of FIG. 1 and shows two loading conveyors feeding two different types of product to the system for weighing and mixing.
Figure 3:
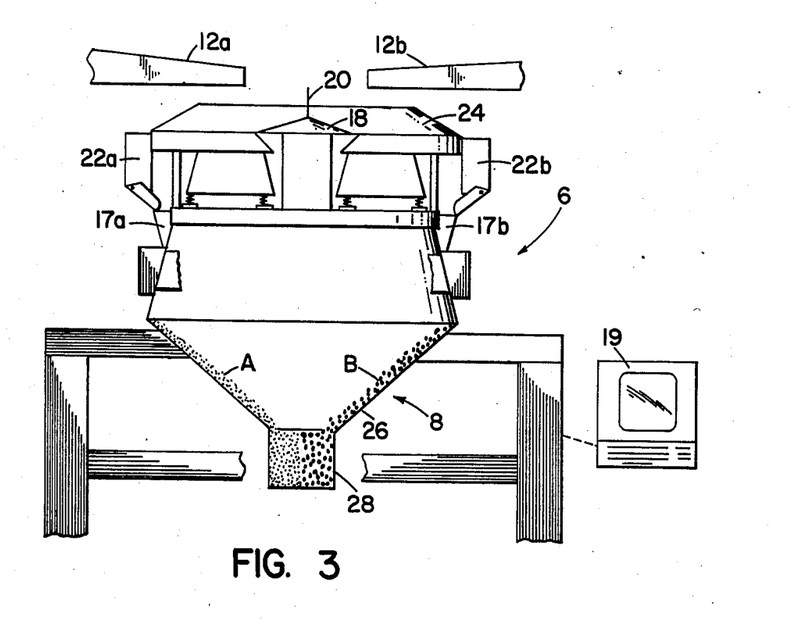
FIG. 3 is a sectional schematic view of the weighing system of FIG. 1 and shows a discharge chute broken away and two products mixing together within the chute.

The feed assembly 16 includes a dome-shaped vibratory feeder 18 located beneath the discharge ends of conveyors 12a and 12b. A partition 20 above the dome 18 keeps the product A delivered by the conveyor 12a to the group of scales 17a separate from the product B delivered by the conveyor 12b to the group of scales 17b. Vibrating chutes 24,24 (FIGS. 2 and 3) lead from the vibratory dome feeder 18 to respective storage hoppers 22,22. The cross-section of each of the chutes 24,24 is "V" shaped, and the chutes 24,24 join one another to form ridges 30,30 between them. The partition 20 intersects the vertical axis of the dome feeder 18, and the bottom edge of the partition follows the contour of two diametrically opposed ridges, leaving a slight clearance to allow for unimpeded vibration of the dome 18 and the chutes 24,24. The clearance is small enough to prevent intermingling of the products A and B while they are located on the dome 18 or the chutes 24,24. The storage hoppers 22,22 serve to collect the products A and B at a relatively slow rate and later transfer them at a fast rate to the associated weighing scales 17,17.

The vibrations of the dome 18 and the chutes 24,24 facilitate the movement of the products A and B to the respective storage hoppers 22,22 and provide means for controlling the rate of movement so that a quantity of product within a predetermined range is deposited into the respective storage hoppers 22,22. This predetermined range of quantities determines the typical number of scales which are combined to yield the fractional target weight. For example, if the total, package target weight is 900 grams, there are two products which form the contents of the package, it is desired that equal amounts of each product form the contents of the package, and it is desired that the contents of five scales of each type of product are typically selected to form the fractional target weight of 450 grams, then the period and magnitude of vibrations of the chutes 22 are adjusted such that approximately 70-110 (mean value of 90) grams of product are fed into each storage hopper 22 for later transfer to the associated weighing scale 17.

After the products A and B are transferred to the weighing scales 17a,17a and 17b,17b and the scales register the weights of the products, the computer searches for a combination of scales 17a,17a and a combination of scales 17b,17b, as discussed below in more detail, to form the contents of the package. After locating suitable combinations, the scales are emptied into the common discharge chute 8 which, in the illustrated embodiment, takes the form of a funnel having an upper cone-shaped portion 26 and a lower cylindrical nozzle portion 28. For a further description of some of the components of the weighing machine 6, reference may be made to U.S. Pat. No. 4,533,007 to Mosher, et al., issued Aug. 6, 1985, assigned to the assignee of the present invention and hereby adopted by reference as part of the present disclosure. A vertical form fill and seal machine 2 (FIG. 1) or other packaging machine may be positioned beneath the common collecting chute 8 to receive batches of combined product.

Figure 4:
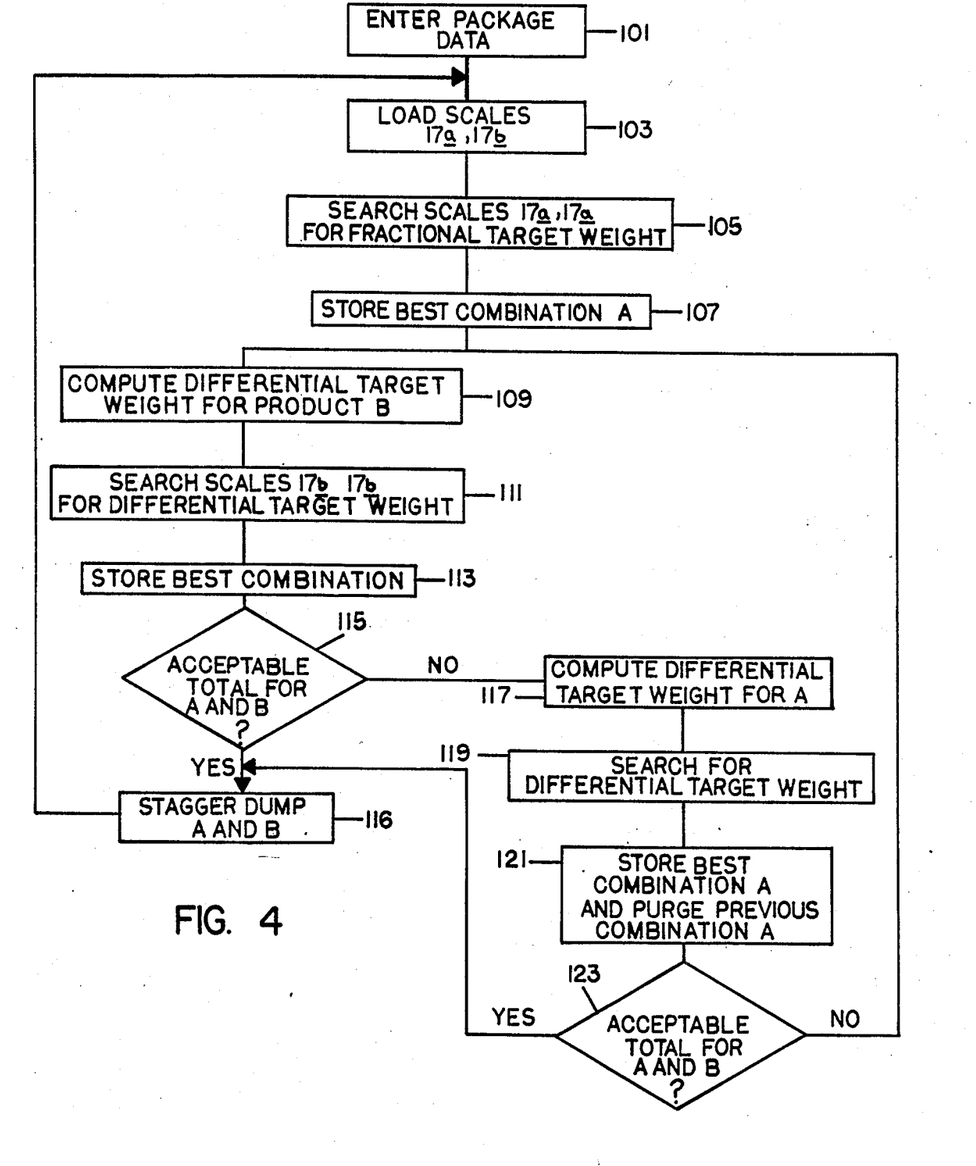
FIG. 4 is a flow chart illustrating a process by which the combination weighing system of FIG. 1 operates.

FIG. 4 is a flow chart illustrating one process by which the combination weighing machine 6 is operated. Initially, an operator enters data (step 101) into the computer 19, which data defines the package target weight for both products A and B combined, the fractional target weight for one of the products A or B, for example, the product A, the allowable giveaway per package and other information relating to the mixing of the two products as discussed in more detail below. Then the scales 17,17 are loaded (step 103) with the two different types of product.

Next, the computer 19 searches (step 105) for a combination of the scales 17a,17a of the first group which contains a combined quantity of product nearest the fractional target weight for the product A. It is not usually critical that this quantity of product be measured precisely at the fractional target weight because the balance of the package weight is made up by the second product B as discussed below. The process described in the U.S. Pat. No. 4,466,500 to Mosher may be utilized to select the combination of scales 17a,17a; however, if desired, the constraint in the Mosher process by which the combination must be at or above a specified weight may be removed or replaced by a large tolerance. In the process illustrated in FIG. 4 of the present invention, the best combination of the scales 17a,17a resulting from the search and the weight thereof is stored (step 107) in memory of the computer 19.

Next, the computer 19 calculates (step 109) the difference between the package target weight and the stored weight of the product A contained in the previously selected combination, which difference becomes the fractional target weight for the product B. Then, the computer performs another search operation (step 111), this time among the scales 17b,17b of the second group to find a combination having a weight equal to or greater than the calculated fractional target weight for the product B. The process of the Mosher '500 patent may be utilized to perform the search of the scales 17b,17b. As with most combination searching processes, this latter search strives to minimize the giveaway. Afterwards, the computer 19 stores (step 113) the scale numbers of the selected combination and the weight of the product in them.

As indicated by step 115, if the giveaway is less than the programmed, tolerable amount, the computer proceeds to dump (step 116) the selected scales 17a,17a and 17b,17b in both groups in a manner discussed in more detail below. If not, the computer 19 proceeds to calculate (step 117) the difference between the package target weight and the weight of the selected scales 17b,17b of the second group. Then, the computer 19 performs another searching operation (Mosher '500 patent) (step 119) to find a combination of scales 17a,17a of the first group which equals or exceeds the newly calculated difference between the package target weight and the weight of the selected scales 17b,17b.

Then, the computer stores (step 121) this combination of scales 17a,17a and their combined weight in memory, and simultaneously purges the previously stored weight value and scale numbers corresponding to the previously determined combination of scales 17a,17a. Also, the computer adds together the weight value of the newly selected combination of scales 17a,17a and the combination of scales 17b,17b and compares the total to the package, target weight. As indicated by step 123, if the giveaway is less than or equal to the programmed, tolerable amount, then the computer 19 proceeds to dump the selected scales 17b,17b and the newly selected scales 17a,17a in the manner discussed below. If not, the computer 19 proceeds to calculate the difference (step 109) between the package target weight and the weight of the newly selected scales 17a,17a, uses this difference as a calculated, fractional target weight for the product B and then searches (step 111) for a suitable combination of the scales 17b,17b as discussed above.

Note that in most cases, the computer 19 needs only one search of the scales 17a,17a and one search of the scales 17b,17b to locate suitable combinations. The interaction between the two sets of scales 17a,17a and 17b,17b in the combination weighing machine 6 and the iterative searching process illustrated in FIG. 4 is available to virtually eliminate the incidence of lock-up when suitable combinations are not located after the first search of the scales 17a,17a and 17b,17b. In addition, the iterative process allows an operator to program a low give-away tolerance without risking much, if any, incidence of lock-up.

If desired, the number of weighing scales and associated storage hoppers and feeding chutes can be reduced from 20 to 18 (9 per product) or even less to decrease the cost of the system. Such a reduction in the number of heads will result in a somewhat greater amount of giveaway. However, with the process illustrated in FIG. 4 for repeating the searching process, the giveaway and incidence of lock-up can be maintained at low levels.

Another way to reduce the number of total heads with a minimal increase to the amount of giveaway, the incidence of lock-up and the number of iterations required to find suitable combinations is to provide a lower number of the first searched scales, for example, eight of the scale 17a,17a in the illustrated embodiment and a larger number of the second searched scales, for example, ten of the scales 17b,17b in the illustrated embodiment, the ten scales providing the accuracy necessary to achieve a successful search of the scales 17b,17b after the first search of the scales 17a,17a in the vast majority of cases. The reduction from ten to eight of the scales 17a,17a only affects the closeness of the quantity of the product 13 to the fractional target weight if the combination search process is successful in the first iteration, and that approximation is usually not critical.

After a combination of the scales 17a,17a and a combination of the scales 17b,17b are located, which combinations satisfy the package target weight and giveaway criteria, and they are dumped, the emptied scales are reloaded and the dome feeder 18 and the feeding chutes 22,22 are set into vibration again to fill the corresponding storage hoppers 22,22. After a brief settling time, the computer 19 is ready to begin another search cycle. For greater speed, the storage hoppers 22,22 which are emptied after a dump operation, may be refilled while the computer 19 searches for appropriate combinations of the filled weighing scales 17,17.

Figure 5:
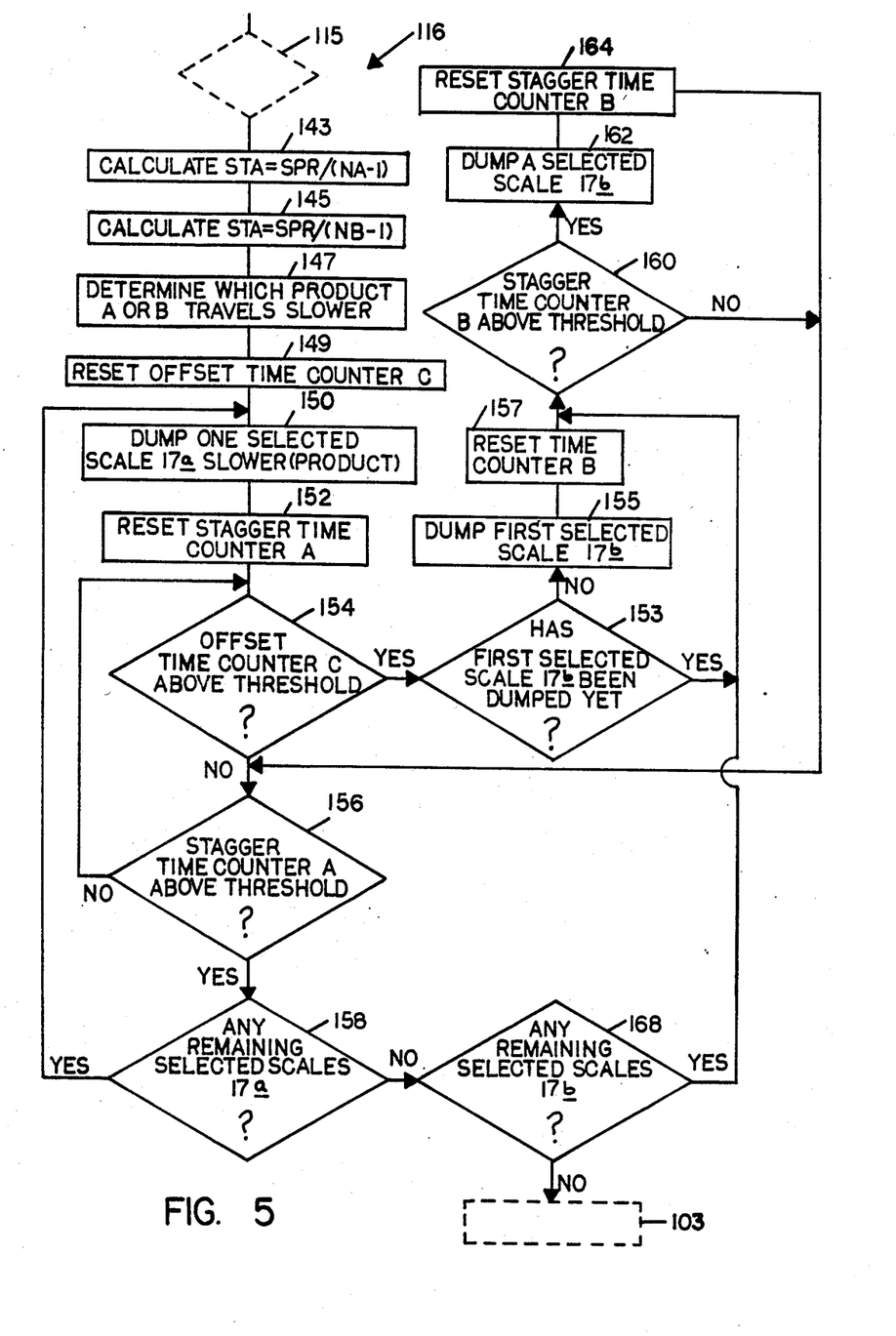
FIG. 5 is a flow chart illustrating a process by which the combination weighing system of FIG. 1 achieves mixing of two different types of products.

After the computer locates suitable combinations of the scales 17a,17a and 17b,17b, the computer institutes a mixing process for timing the dumping of the scales. By a flow chart, FIG. 5 illustrates the mixing process which flowchart is an elaboration of the step 116 of FIG. 4. The resultant dump timing is illustrated in FIG. 6.

During the step 101 indicated above in FIG. 4, an operator inputs information to the computer defining the time it takes for each of the products to travel from the weighing hopper to the nozzle portion 28 of the common discharge chute 8 where much of the mixing takes place. During this step, the operator also enters a suitable time over which to spread the dumping of the scales within each group to provide a continuous flow of the respective products to the nozzle portion 28 but to avoid bridging, a condition in which so much product arrives at the nozzle portion at one time that it clogs the nozzle portion. By way of example, let us assume that the product B in each selected scale 17b take 0.3 seconds to reach the nozzle portion 28 after discharge from the scales and the product A in each selected scale 17a takes 0.9 seconds to reach the nozzle portion 28 after discharge from the scale and that a suitable spread time for each combination of scales is 1.0 seconds.

Initially, as indicated by steps 143 and 145 in the flow chart of FIG. 5, the computer determines a stagger dump interval between dumping of the selected scales within each group for each of the products A and B, respectively. The stagger time, STA, equals the dump spread time selected by the operator divided by the number of scales selected by the computer from each group minus one. Next, the computer determines (step 147) from the travel time data entered by the operator which product, A or B, travels slower, in this case the product A. This may be due to a higher moisture content or stickiness of the product A relative to that of the product B. An offset time counter C is reset (step 149) which offset counter is periodically incremented by a clock within the computer 19 and, as discussed in more detail below, ensures that the products A and B arrive simultaneously within the nozzle portion 28 to mix together.

Figure 6:
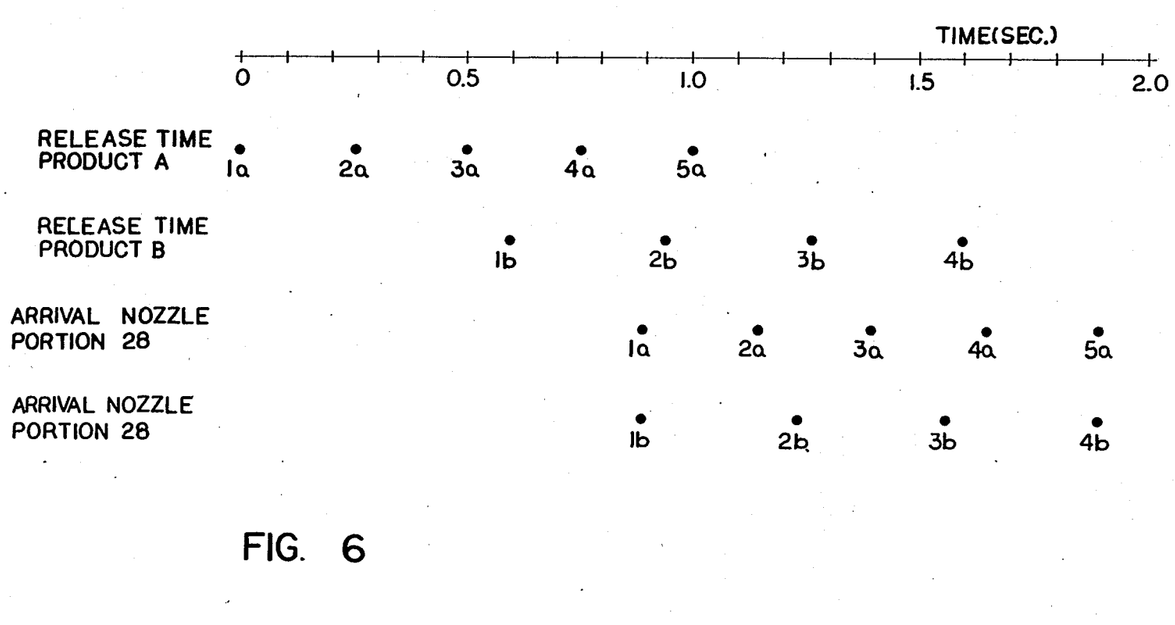
FIG. 6 is a timing diagram illustrating the times at which a combination of scales of one product and a combination of scales of another product are dumped relative to one another to achieve mixing within a common discharge chute.

In this example, let us also assume that five of the scales 17a,17a identified as numbers 1a–5a in FIG. 6 and that four of the scales 17b,17b, identified as number 1b–4b in FIG. 6 were previously selected (steps 101–123 of FIG. 4) as suitable combinations to fill one package and that the dump spread time equals one second. Consequently, the stagger times for the products A and B equal 0.25 and 0.33 seconds respectively. Turning back again to the flow chart of FIG. 5, number 1a of the scales 17a,17a is immediately dumped (step 150), and then stagger timer A is reset. (step 152). The stagger time counter A is periodically incremented by the clock. Next, the computer determines (step 154) whether the offset time counter C has reached a threshold level, the count which corresponds to the difference in travel time between the product A and the nozzle portion 28 and the product B and the nozzle portion 28. In the example illustrated in FIG. 6, the offset time is 0.6 seconds and will not yet have elapsed. Consequently, the computer then reads the stagger time counter of the slower product A (step 156) to determine whether it has reached its threshold level, the count which corresponds to the stagger time for the product A. Because of the high speed of the computer, the stagger time of 0.25 seconds will not have elapsed yet. Consequently, the computer loops around steps 154 and 156 until either of the time counters A or C has reached its threshold level. In this example, the time counter A will reach its threshold level first, at which time, the computer determines (step 158) whether any of the selected scales from set number 1a–5a have yet to be dumped in this cycle. Since there are scales remaining at this time, the computer loops back to the step 150 and dumps the scale number 2a. Scale number 3a is dumped after similar looping of the steps 154 and 156. Then, the computer resets the stagger time counter A and then rechecks the offset time counter C. Because the offset time counter is set for 0.6 seconds, the computer will again loop around the steps 154 and 156 until the offset time counter A reaches its threshold level. At approximately 0.6 seconds after the scale number 1a was dumped, the offset time counter will reach its threshold and after determining that the scale number 1b has yet to be dumped (step 153), the computer will dump (step 155) the scale number 1b. Because of the difference in travel speeds, the product from the scale number 1a will arrive at the nozzle portion 28 at approximately the same time as the product from the scale number 1b and thereby mix. Next, the computer resets (step 157) the stagger time counter 13. Then, the computer checks a stagger time counter B to determine if it has reached its threshold (step 160), which will not yet be true. Consequently, the computer proceeds to check (step 160) the output of the stagger time counter A. If the stagger time counter A has not yet reached its threshold level again, the computer loops through the steps 154,153,160 and 156 until either stagger time counter A or B reaches its threshold count. Note that because the offset time counter C was not reset after the scale 1b was dumped, it is still above its threshold level, and the computer proceeds to check the output of the stagger time counter B (step 160) before checking the stagger time counter A (step 156). In the illustrated example, the stagger time counter A reaches its threshold before the counter B and the computer again checks if there are any of the scales number 1a–5a available to be dumped (step 158). When it determines that the scales numbered 4a–5a are available, it dumps number 4a (step 150). Then the computer resets the stagger time counter A and again loops through the steps 154,153,160 and 156 until the stagger counter B reaches its threshold level. Upon learning that the selected scales 2b–4b are available to be dumped (step 161), the computer proceeds to dump scale number 2b (step 162) and proceeds to reset (step 164) the stagger time counter B. This process continues until the scale number 5a is dumped at which time (step 158) the computer loops through the steps 168, 160, 162, 164, 156 and 158 until all of the scales number 3b–4b have been dumped. After the scale number 4b has been dumped, its product reaches the nozzle portion at approximately the same time as the product from the scale number 5a. After the product from all of the selected scales 17a,17a and 17b,17b has been received within the package of the bagging machine 3 below, one complete cycle of machine operation has been completed. The timing chart of FIG. 6 summarizes the mixing process as follows:

Scale #1a is dumped at a time designated 0, scale #2a is dumped at a time 0.25 seconds, scale #3a is dumped at a time 0.5 seconds, scale #4a is dumped at a time 0.75 seconds, and a scale #5a is dumped at a time 1.0 seconds essentially forming a stream of the product A. Scale #1b is dumped 0.6 seconds after the scale #1a is dumped. The scale #2b is dumped at time 0.93 seconds, the scale #3b is dumped at time 1.27 seconds, and the scale #4b is dumped at time 1.6 seconds, essentially forming a stream of the product B. Notice that because of the relatively high moisture content or stickiness of the product A, the product A of the scale #1a does not arrive at the nozzle portion 28 of the common discharge chute 8 until approximately 0.9 seconds after it was dumped and the product of the other scales 17a,17a of the selected combination arrive at the nozzle at 0.25 second intervals thereafter. Because of the relatively low moisture content and relatively low stickiness of the product B, the product B of the scale #1b reaches the nozzle portion 28 approximately 0.3 seconds after it was dumped, and because of the 0.6 second delay, arrives at the nozzle portion 28 at approximately the same time as the product A from the scale #1a. The product B in the other scales number 2b–4b arrive at approximately 0.33 second intervals thereafter. Because of the relatively small diameter of the nozzle portion 28 of the common discharge chute 8, and the significant speed at which the products A and B descend along the common discharge chute, the product A mixes with the product B to a large degree in the nozzle portion 28. Also, there may be some mixing within the funnel portion 26. It should be noted that the reason that all of the selected scales 17a,17a are not dumped simultaneously, and likewise, all of the selected scales 17b,17b are not dumped simultaneously (with the 0.6 second offset) is to prevent clogging of the nozzle portion 28. In some applications, clogging is not a problem so simultaneous dumping is possible to decrease the overall dump time and increase the bag rate.

It should also be noted that the dump timing of the scales 17a,17a and 17b,17b illustrated in FIG. 6 is but one example of a staggered timing sequence which is suitable for a given type of product A and a given type of product B, and the amount of staggering and offset depends on such factors as the speeds at which the products travel down the chute 8.

By the foregoing, a combination weighing system emboding the present invention has been disclosed. However, numerous modifications and substitutions may be made without deviating from the scope of the invention. For example, if desired the scales 17,17 may be divided into three or more groups and corresponding products, three conveyors provided for feeding three different types of products, one for each group of the scales 17,17 and a "Y-shaped" partition for the dome feeder 18 and the chutes 22,22 provided to prevent intermingling of the different products while located on the dome feeder 18 and the feeding chutes 22,22. In this arrangement, approximately six scales may be designated for a first type of the product, approximately six scales may be designated for a second type of the product, and approximately eight scales may be designated for a third type of product, and the combination searching process carried out in that order, or possibly, the total number of scales 17,17 may be increased to provide two more scales, chutes, and collecting hoppers for each type of product.

Also, if desired, the funnel portion 26 of the common discharge chute 18 can be replaced by discrete chutes, each of which discrete chutes leading from one of the scales 17,17 to the funnel portion 28. Also, if desired, the dome portion 18 can be split along the partition and two separate vibration motors and controls provided for each half so that independent vibration control can be provided for the two different types of products 13 and 15. Therefore, the invention has been disclosed by way of illustration and not by limitation.

I claim:

1. A combination weighing system for weighing out quantities of at least two of different types of products to contribute to a package, said system comprising:
    a first plurality of weighing scales for weighing out quantities of a first product,
    a second plurality of weighing scales for weighing out quantities of a second product, said first product being a different type than said second product,
    combination search means for selecting from said first plurality of weighing scales a combination which contains a combined quantity of said first product near in weight to a predetermined fractional target weight, and for selecting from said second plurality of weighing scales a combination which contains a combined quantity of said second product near in weight to the difference between a combined target weight for said first and said second types of products within said package and the weight of said first product within the selected combination of said first plurality of scales.

2. A combination weighing system as set forth in claim 1 wherein said combination search means further comprises means for selecting from said first plurality of weighing scales a second combination which contains a combined quantity of said first product near in weight to the difference between said combined target weight and the combined weight of said second product within the selected combination of said second plurality of scales.

3. A combination weighing system as set forth in claim 2 wherein said combination search means includes means for selecting the second combination of said first plurality of weighing scales when the sum of the weight of the first product within the scales first selected from the first plurality of scales and the weight of the second product within the scales selected from the second plurality of scales deviates from the package target weight by an amount which is greater than a predetermined amount.

4. A combination weighing system as set forth in claim 1 wherein said combination search means selects from said second plurality of weighing scales a combination which contains a combined quantity of said second product which is at least as great as the difference between said combined target weight and the combined quantity of said first product within the scales selected from said first plurality of scales.

5. A combination weighing system as set forth in claim 1 wherein said combination search means selects from said first plurality of weighing scales a combination which contains a combined quantity of said first product at least as great as said predetermined fractional target weight.

6. A combination weighing system as set forth in claim 1 further comprising means for delivering quantities of said first type of product to said first plurality of weighing scales, for delivering quantities of said second type of product to said second plurality of weighing scales and for isolating said first type of product from said second type of product while said first and said second types of product are being delivered to said first and said second pluralities of weighing scales.

7. A combination weighing system as set forth in claim 1 further comprising:
    a discharge chute positioned to receive the output of said first and said second plurality of weighing scales, and
    means for dumping said selected combination of scales of said first plurality and said selected combination of scales of said second plurality at times which cause the first type of product contained within the selected combination of scales of said first plurality to mingle in said chute with the second type of product discharged from the selected combination of scales of said second plurality.

8. A combination weighing system as set forth in claim 7 wherein said combination search means further comprises means for searching said first plurality of weighing scales for a combination which contains a combined quantity of said first product near in weight to the difference between the package target weight and the combined weight of said second product within the selected combination of said second plurality of scales.

9. A combination weighing system as set forth in claim 7 wherein the dumping means includes means for dumping the scales of said combination of the first plurality of scales in a staggered manner and dumping the scales of said combination of said second plurality of scales in a staggered manner.

10. A combination weighing system as set forth in claim 9 wherein the dumping means further includes means for spreading the dumping of the scales of said combination of the first plurality of scales over a first preprogrammed interval and spreading the dumping of the scales of said combination of the second plurality of scales over a second, preprogrammed interval.

11. A combination weighing system as set forth in claim 10 wherein said first, preprogrammed interval is substantially the same as said second, preprogrammed interval.

12. A combination weighing system as set forth in claim 10 wherein
    the dumping of the scales of said combination of the first plurality occurs at approximately equal intervals and
    the dumping of the scales of said combination of the second plurality occurs at approximately equal intervals.

13. A combination weighing system as set forth in claim 12 wherein the intervals between dumps of the combination of the first plurality of scales are different than the intervals between dumps of the combination of the second plurality of scales when the number of selected scales of the first plurality is different than the number of selected scales of the second plurality.

14. A combination weighing system as set forth in claim 1 wherein there is a different number of the weighing scales in first plurality than in the second.

15. A combination weighing system as set forth in claim 14 wherein there are more weighing scales in the second plurality than in the first plurality.

16. A combination weighing system for weighing out quantities of at least two different types of products to contribute to a single package and mixing the different products together, said system comprising:
a first plurality of weighing scales for weighing-out quantities of a first type of product,
a second plurality of weighing scales for weighing-out quantities of a second type of product different from the first type,
a discharge chute positioned to receive the output of both said first and said second plurality of weighing scales,
combination search means for selecting a combination of said first plurality of weighing scales to contribute to a package and for selecting a combination of said second plurality of scales to contribute to said package, and
means for dumping the selected scales of said first plurality of scales and the selected scales of said second plurality of scales in a staggered manner to cause said first type of product to mingle in said chute with said second type of product.

17. A combination weighing system as set forth in claim 16 wherein the staggered dumping of the selected scales of said first plurality of scales is offset in time from the staggered dumping of the selected scales of said second plurality of scales to compensate for a difference in travel time of the products of each plurality of scales, between their respective scales and a region of said chute where the mingling occurs.

18. A combination weighing system as set forth in claim 16 wherein the dumping means further includes means for spreading the dumping of the scales of said combination of the first plurality of scales over a first preprogrammed interval and spreading the dumping of the scales of said combination of the second plurality of scales over a second, preprogrammed interval.

19. A combination weighing system as set forth in claim 18 wherein said first, preprogrammed interval is substantially the same as said second, preprogrammed interval.

20. A combination weighing system as set forth in claim 18 wherein
the dumping of the scales of said combination of the first plurality occurs at approximately equal intervals and
the dumping of the scales of said combination of the second plurality occurs at approximately equal intervals.

21. A combination weighing system as set forth in claim 20 wherein the intervals between dumps of the combination of the first plurality of scales are different than the intervals between dumps of the combination of the second plurality of scales when the number of selected scales of the first plurality is different than the number of selected scales of the second plurality.

22. A process for weighing out quantities of at least two different types of products to contribute to a package, said process comprising the steps of:
weighing out a plurality of quantities of a first type of product,
weighing out a plurality of quantities of a second type of product, said first product being a type different from said second product,
selecting a combination of said first plurality of quantities of said first type of product with combination contains a combined quantity of said first type of product near in weight to a first predetermined fractional target weight,
determining a second fractional target weight from the difference between a total weight for the first and second type of products in a package and the weight of said first type of product in the selected combination of said first plurality of quantities, and
selecting a combination of said second plurality of quantities of said second type of product which combination contains a combined quantity of said second type of product near in weight to the second fractional target weight.

23. A process as set forth in claim 22 further comprising the step of;
selecting another combination of quantities of said first type of product which other combination contains a combined quantity of said first type of product near in weight to the difference between the total weight for said first and second types of product and the combined weight of said second type of product within said selected combination of said quantities of said second type of product.

24. A process as set forth in claim 22 further comprising the step of dumping the selected quantities of said first type of product and the selected quantities of said second type of product into a common vessel to cause said first type of product to mingle and mix with said second type of product.

25. A process as set forth in claim 24 wherein the selected quantities of said first type of product are dumped in a staggered manner and the selected quantities of said second type of product are dumped in a staggered manner.

26. A process for weighing out quantities of at least two different types of products to contribute to a single package and mixing the different types of products together, said process comprising the steps of:
weighing out quantities of a first type of product,
weighing out quantities of a second type of product,
seleting a combination of said first plurality of quantities to contribute to a package and selecting a combination of said second plurality of quantities to contribute to said package, and
dumping the selected quantities of said first product and the selected quantities of said second product in staggered relationship into a common vessel at times which cause said first type of product to mingle with said second type of product in said vessel.

27. A combination weighing system for separately weighing out at least two charges of product for joinder in a single package at a combined target weight for the two charges, said system comprising:
a first plurality of weighing scales to weigh out a first set of product quantities and to generate signals representing the weight of each quantity in the first 'set,
a second plurality of of weighing scales to weigh out a second set of product quantities and to generate signals representing the weight of each quantity in the second set, and
combination search means responding to the weight signals from the scales for searching said first plurality of weighing scales to select a first combination of scales which yield a first charge of product near in weight to a predetermined first fractional target weight, then determining a second fractional target weight from the difference between a combined target weight for the first and second charges of product and the weight of said first charge of product in the selected combination of said first plurality of scales and searching said second plurality of weighing scales to select a second combination of scales which yield a second charge of product near in weight to the second fractional target weight.

28. A combination weighing system as set forth in claim 27 wherein said combination search means further comprises means for selecting from said first plurality of weighing scales a second combination of scales which contains a charge of product near in weight to the difference between said combined target weight and the weight of said second charge of product most closely approximating the second fractional target weight.

29. A combination weighing system as set forth in claim 28 wherein said combination search means includes means for selecting the second combination of said first plurality of weighing scales when the weight of the first charge of product within the combination first selected from the first plurality of scales added to the weight of the second charge of product within the combination selected from the second plurality of scales deviates from the combined target weight by an amount which is greater than a predetermined amount.

30. A combination weighing system as set forth in claim 27 wherein said combination search means selects from said second plurality of weighing scales a combination which contains a charge of product which is at least as heavy as the difference between said combined target weight and the charge of product within the scales selected from said first plurality of scales.

31. A combination weighing system as set forth in claim 27 wherein said combination search means selects from said first plurality of weighing scales a combination which contains a charge of product at least as great as said predetermined fractional target weight.

32. A combination weighing system as set forth in claim 27 further comprising:
   a discharge chute positioned between the pluralities of scales and a package to receive the charges from said first and second pluralities of weighing scales and direct the charges to the package, and
   means for dumping said selected combination of scales of said first plurality and said selected combination of scales of said second plurality in staggered relationship.

* * * * *